United States Patent
Khashoggi

Patent Number: 5,819,636
Date of Patent: Oct. 13, 1998

[54] MULTI-FUNCTIONAL PROGRAMMABLE FOOD PROCESSOR

[75] Inventor: Alaa Khashoggi, Golfe Juan, France

[73] Assignee: Gentech Sarl, Biot, France

[21] Appl. No.: 864,749

[22] Filed: May 29, 1997

[30] Foreign Application Priority Data

May 29, 1996 [FR] France ................................ 96 07166

[51] Int. Cl.$^6$ ............................ A47J 27/00; A47J 43/07; A47J 43/08; A47J 43/046

[52] U.S. Cl. ................................ 99/326; 99/331; 99/348; 99/352; 366/146; 366/177.1; 366/241

[58] Field of Search ............................ 99/325, 326–331, 99/334, 348, 352–355, 407, 409; 222/501, 168.5; 241/37.5, 92, 282.1, 282.2; 364/400; 366/144–146, 241, 244, 261, 287, 292, 177.1, 182.1; 426/523; D7/323, 287

[56] References Cited

U.S. PATENT DOCUMENTS

| | | | |
|---|---|---|---|
| 2,633,170 | 3/1953 | Balmain | 222/501 X |
| 4,121,301 | 10/1978 | De Francisci | 99/353 |
| 4,196,660 | 4/1980 | Steinberg | 99/353 |
| 4,459,449 | 7/1984 | Hiraia | 99/325 X |
| 4,503,502 | 3/1985 | Chapin | 99/348 X |
| 4,938,125 | 7/1990 | Wong | 99/326 |
| 4,994,294 | 2/1991 | Gould | 99/348 X |
| 5,083,506 | 1/1992 | Horn et al. | 366/297 X |
| 5,297,475 | 3/1994 | Borger et al. | 366/324 |
| 5,408,922 | 4/1995 | Gupta | 99/348 X |
| 5,469,782 | 11/1995 | Wong | 99/352 |
| 5,535,665 | 7/1996 | Wong | 366/244 |
| 5,669,288 | 9/1997 | Zittel et al. | 99/409 X |

Primary Examiner—Timothy F. Simone
Attorney, Agent, or Firm—Morgan & Finnegan, L.L.P.

[57] ABSTRACT

The invention concerns a multi-functional programmable food processor for the preparation of cooked dishes, comprising a principal body, a processing receptacle, a container, divided into several compartments destined to contain the ingredients, arranged above the receptacle, each compartment featuring an aperture, rotary disk for connecting compartments of the container with the receptacle and drive mechanism, utensils for handling the ingredients within the receptacle and with the respective drive mechanisms, heating the receptacle, microprocessor for programming and control of the processor wherein the container is mounted fixed on receptacle via an intermediate element in operating position, whereby the receptacle, the container and the intermediate element constitute a set mounted fixed on the body of the processor in operating position, and rotary disk for connecting compartments of the container with the receptacle arranged within the intermediate element.

19 Claims, 6 Drawing Sheets

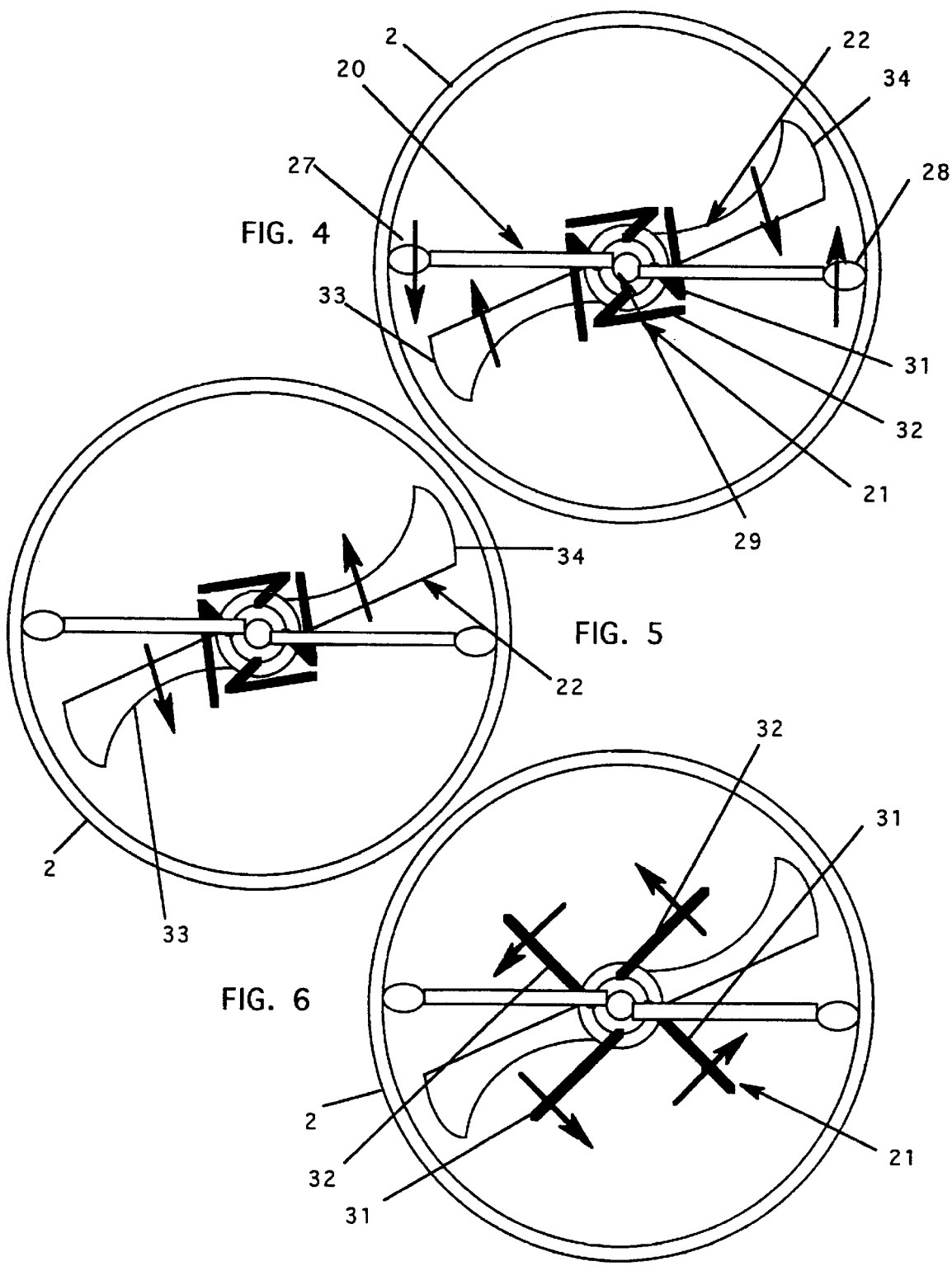

MULTI-FUNCTIONAL PROGRAMMABLE FOOD PROCESSOR

BACKGROUND OF THE INVENTION

The invention concerns a multi-functional programmable food processor for the preparation of cooked dishes.

For the preparation of cooked dishes, one uses programmable cooking appliances which permit the preparation of kitchen recipes. These appliances command a sequence of stages in the preparation of the recipes, comprising the cooking, the addition of ingredients and the blending of ingredients.

For this purpose, one known type of cooking appliance comprises a processing receptacle, generally cylindrical in shape, as well as means of heating such receptacle, and means of blending inside the receptacle, constituted by a rotating spatula. The processing receptacle generally includes a lid featuring an aperture to permit the addition of the ingredients.

On top of such processing receptacle, there is arranged a compartmentalized carousel intended to contain the different ingredients of the recipe. The bottom of each compartment features an emptying aperture outfitted with a movable shutter. The carousel is activated in step by step rotational movements, in such a way that each compartment is successively placed on top of the aperture of the lid. At this time the moveable shutter is displaced, for example by a cam mechanism, in such a way as to release the emptying aperture.

The totality of the appliance functions, notably the sequence and the duration of the cooking, blending, ingredient addition stages, etc., is governed by a programmable automated system based on recipe programs chosen by the user.

One example of an appliance of this type is presented in U.S. Pat. No. 4,649,810.

One drawback of known appliances lies in the elevated number of parts in motion. Notably, the solution involving the rotary carousel requires complex means of activation. The movable shutter mechanism is similarly complicated and easily subject to breakdown.

Beyond that, notwithstanding the sophisticated construction of such appliances, the means of food processing are limited, in that they are limited to just cooking, blending and the addition of ingredients.

BRIEF SUMMARY OF THE INVENTION

One of the aims of the invention is to remedy these drawbacks and propose a programmable appliance for the preparation of cooked dishes featuring a simplified drive mechanism, so as to improve its performance and reliability.

Another aim of the invention is to propose a programmable appliance endowed with supplementary functions, so as to permit preparation of more complex recipes, notably combining the functions of cooking appliances with those of conventional multi-purpose kitchen aids.

To this end, a food processor, according to the invention, for the preparation of cooked dishes, comprising:
  a main processor body;
  a receptacle for the preparation of cooked dishes;
  a container divided into several compartments designed to contain the ingredients for the cooked dish, the same being arranged on top of the receptacle, each compartment featuring an aperture;
  means for providing connections between the container compartments and the receptacle and devices for driving such means of connection starting form the main processor body;
  means for the handling of ingredients inside the receptacle, and means to drive such handling devices starting from the main processor body;
  means of heating the receptacle;
  means of programming and activating the devices for heating, handling, connection and drive; is characterized in that
  the container is mounted fixed on the receptacle by means of an intermediate element in operating position;
  the receptacle, the container and the intermediate element constitute a unit mounted fixed on the processor body in operating position;
  the means of establishing connection between the compartments of the container and the receptacle are arranged within the intermediate element.

Preferably, the set formed by the receptacle, the intermediate element and the container is movable and the processor includes means for locking and unlocking the set on the body of the processor as well as means for coupling and uncoupling the drive between the set and the body of the processor.

Preferably, the compartments are arranged in sectors.

According to a first embodiment, the means for establishing the connection are constituted by a rotary disk featuring an aperture.

For liquid ingredients, the aperture of at least one compartment features a shutter situated on the path of the aperture of the rotating disk which is reset away from the aperture of the compartment by a spring in such a way as to be open when the aperture of the disk stands to the right of the compartment aperture, and otherwise closed.

In such a case, the border of the aperture on the rotating disk situated backward in relation to the direction of the rotation of the disk is preferably tilted in and up to down direction towards the interior of the aperture, in such a way as to facilitate the reassembly of the shutter or shutters.

According to a second embodiment:
  the means establishing the connection feature a central rotating cam;
  each compartment of the container features articulated flaps capable of closing off the aperture;
  the flaps on each compartment are brought back to open setting by springs and are held in closed position by a bolt;
  the bolts of the compartments are arranged in such a way as to be successively brought to open position by the central rotating cam.

According to a first embodiment of the means of handling of the foodstuffs, the latter are borne by an intermediate element.

According to a second embodiment, the means of handling are borne by a base offset from the body of the appliance.

The means for driving the agitator and/or the means for establishing the connection may comprise at least one motor and one set of gears connected to the pinions on the shaft of the means of handling.

As an alternative, the drive means may comprise at least one motor and a set of belts surrounding the pulleys on the shafts of the means of handling.

The receptacle is preferably shaped as a rotating cylinder, the means of handling comprise means of blending, means of stirring and means of cutting, the same being mounted to revolve on a nest of shafts along a central vertical shaft of the receptacle.

The means of mixing may comprise spatulas with at least one horizontal flank and one eccentric vertical flank adjacent to the vertical peripheral wall of the receptacle.

The means of stirring may comprise a whisk folding against the set of shafts.

The means of cutting may comprise blades with one large flank for low speed mixing in one sense and a sharp cutting edge for high speed cutting in the other direction.

BRIEF DESCRIPTION OF THE DRAWINGS

The invention will be more comprehensible by reading the following description of an embodiment illustrated by reference to the attached drawings, among which:

FIGS. 4, 5 and 6 are schematic, detailed plane and cross-section views of the processor represented in FIG. 1, illustrating different modes of operation of the means of handling of the processor;

DETAILED DESCRIPTION OF THE INVENTION

Figure 1:
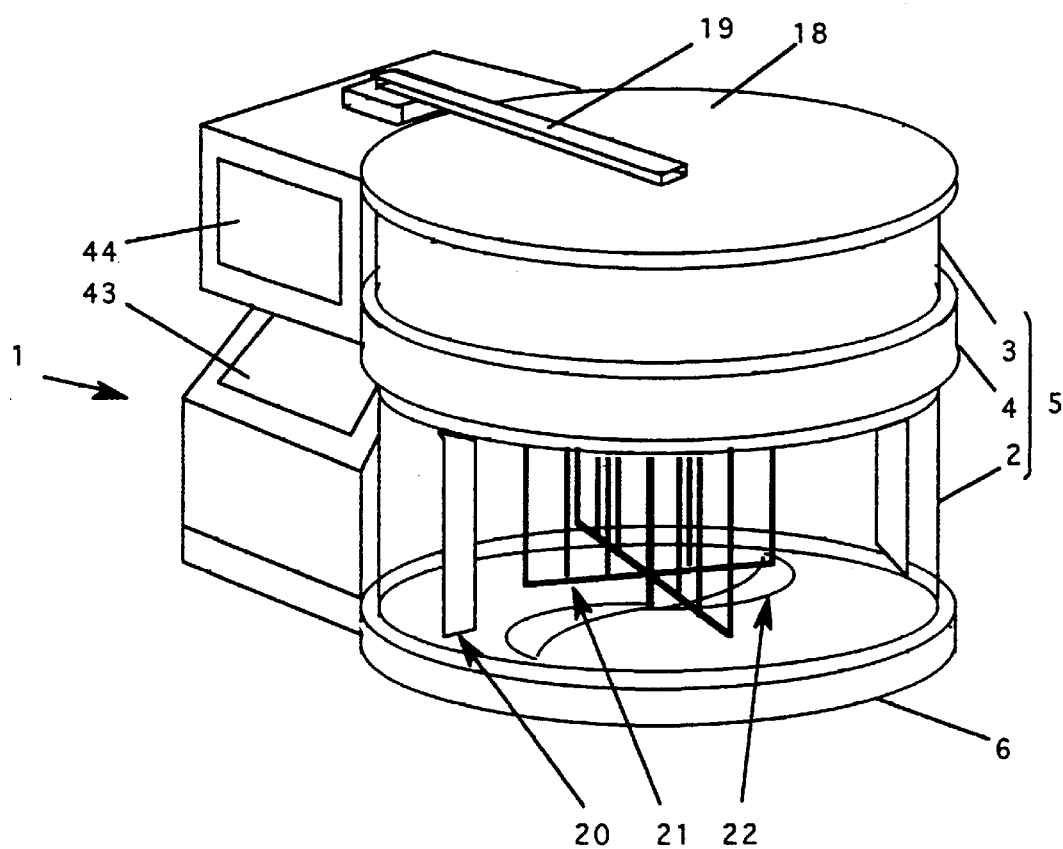
FIG. 1 is a perspective view of a food processor according to the invention.
Figure 2:
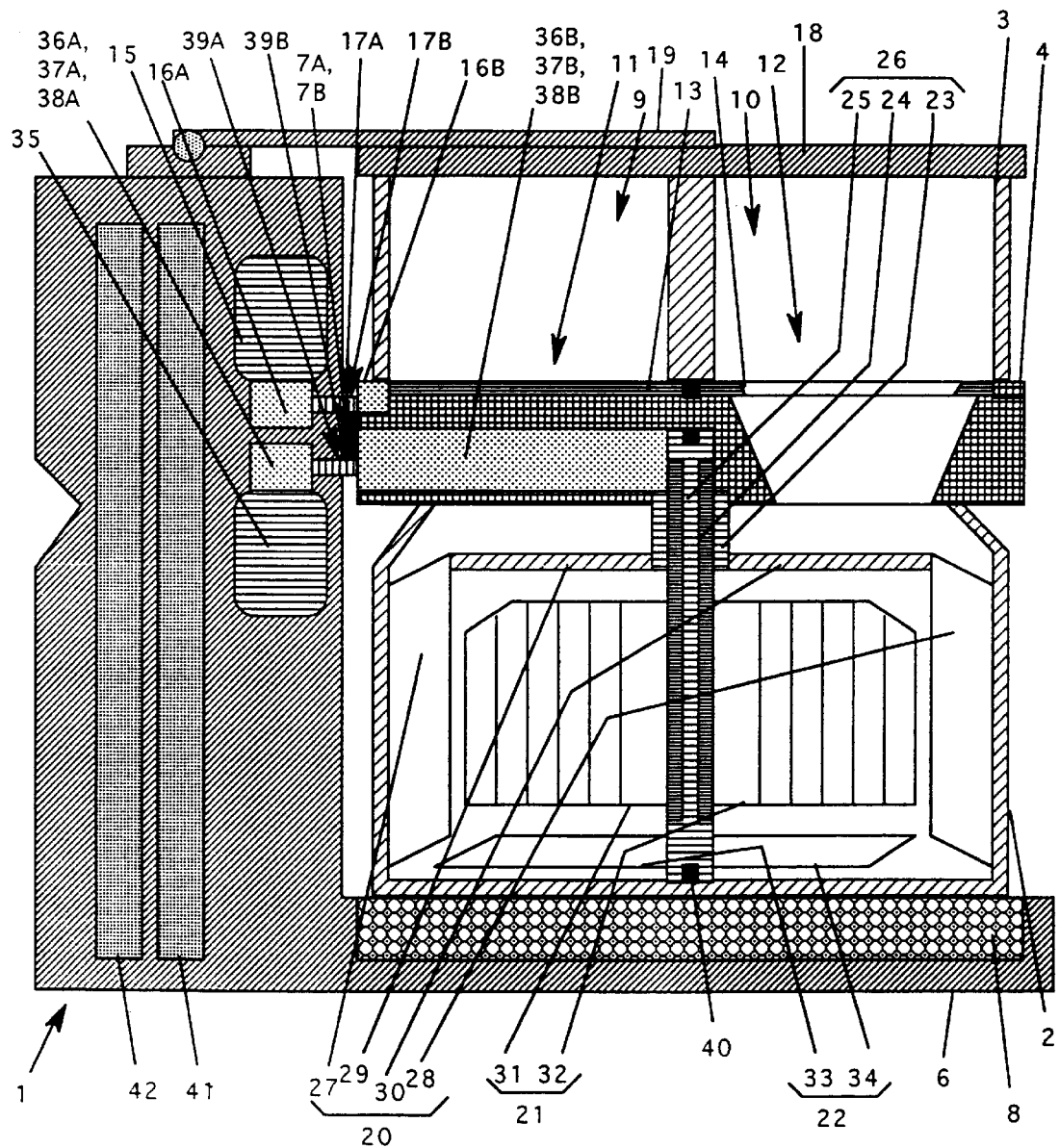
FIG. 2 is a vertical cross-section of the processor shown in FIG. 1.

FIGS. 1 and 2 represent a food processor featuring a principal element or body designated in its entirety by reference number 1, grouping most of the technical functions, a movable receptacle 2 destined to contain the cooked dish and a compartmentalized container 3, equally movable, destined to contain the ingredients of the dish.

Container 3 is suitable for fixed mounting on receptacle 2 by means of an intermediate element 4, so as to constitute a movable set which shall be designated by reference number 5. In this case, container 3 is arranged above the receptacle 2, whereby the intermediate element 4 is shaped as an interposed level.

The body 1 combines the functions of driving, controlling and programming the food processor. It is shaped as a block consisting of an offset base 6 upon which the movable set 5 may be placed in an operating position.

The movable set 5 is designed to permit locking against the body 1 in this operating position. The locking is accomplished by complementary locking and unlocking devices 7A, 7B provided on the body 1 and on the intermediate element 4 (FIG. 2).

Base 6 contains means of heating, for example an electric resistance coil 8 or similar means.

As an alternative, receptacle 2 may feature a heating bottom, in which case, means for electric connection are provided between the receptacle 2 and the body of the appliance 1 in operating position, for example through the intermediate element 4 by a connecting/disconnecting device.

Receptacle 2 is generally of a cylindrical rotating shape. It is totally open in its upper portion.

Container 3 is likewise of a generally cylindrical shape. Its lower portion is about the same diameter as the upper portion of receptacle 2. It is dived into various compartments such as 9, 10. These compartments 9, 10 are shaped as angular sectors. Each one of them features an opening 11, 12 at the level of the bottom.

The intermediate element 4 is generally ring shaped and contains a device connecting the compartments 9, 10 of container 3 with the receptacle 2. This connecting device is constituted by a rotary disk 13 featuring an aperture 14 shaped as an angular sector approximately of the same form as one of the compartments 9, 10 in the upper portion of container 3.

It will be noted that these compartments may be of identical or different dimensions and shapes. Where the dimensions are different, the aperture 14 of the rotary disk 13 shall preferably be of dimensions inferior or equal to those of the smallest compartment. The movements of disk 13 are regulated in such a fashion as to present the aperture 14 successively below each of the compartments 9, 10, and on the totality of the bottom 11, 12 thereof. This result may be obtained, for example, by a detector of the angular position of disk 13 corresponding to the radial extremities of each of the compartments 9, 10.

Disk 13 is designed to permit rotary movement, for example step by step, by a motor 15 positioned within the principal element 1 by means of a drive mechanism 16, in such a way as to release the bottom of each of the compartments 9, 10 in succession. The drive mechanism 16 is positioned by one of its parts 16A inside the body 1 and by its other part 16B within the intermediate element 4, whereby coupling/uncoupling devices 17A, 17B are provided at the interface between the body 1 and the intermediate element 4. The coupling/uncoupling device 17 may be advantageously associated with the locking/unlocking device 7 between the intermediate element 4 and the body 1.

The driving device 16 is advantageously constituted by gears to achieve the desired gear reduction so as to drive the rotary disk 13 at a suitable speed.

The coupling/uncoupling device 17 may be realized for example by a horizontal rotating half-shaft projecting perpendicularly to the body 1 at the level of the placement of the intermediate element 4, featuring a coupling organ upon which is clamped a complementary coupling organ of a half-shaft of the intermediate element 4.

The means of locking and unlocking 7 may be constituted for example by a clamping system or any other analogous device.

Container 3 is outfitted with a protective lid 18. The lid is mounted with the aid of an arm 19 articulated on body 1 of the appliance. In one simplified embodiment, the operation of the lid 18 may be activated by the user. In a variant, the arm 19 may be restored to the open setting by a spring and kept in the closed setting by a locking and unlocking mechanism. According to an even more elaborate variant, provision may be made for means of driving and controlling arm 19 in open and closed settings.

Lid 18 is detachable from arm 19 so as to permit ease of cleaning.

On the interior of receptacle 2 there are means of handling of the foodstuffs in the form of mixing devices 20, agitators 21 and cutters 22. These means of handling 20, 21 and 22 are constituted by one or more utensils mounted on a central vertical shaft respectively 23, 24, and 25. In order to permit independent drive of each of these devices, the shafts 23, 24 and 25 are nests of shafts, forming a set of shafts designated by reference number 26.

The means of mixing 20 include in the example illustrated herein two lateral spatulas 27, 28 diametrically opposed to each other and adjacent to the vertical peripheral wall of receptacle 2 from top to bottom. These spatulas are linked to central shaft 23 by means of upper arms 29, 30. The spatulas 27, 28 are intended to scrape off the ingredients from the wall of receptacle 2, so that they may drop back to the bottom of the latter. To this effect the spatulas 27, 28 are advantageously profiled and inclined, being made of pliable material.

The means of stirring 21 comprise a collection of wires 31, 32 forming a whisk mounted on central shaft 24.

As an example the wires 31, 32 of the whisk may be articulated and arranged in such a way as to abut the set of shafts 26 24 in one sense of rotation, and to spread out in the other sense of rotation (FIGS. 4 to 6).

The cutting means 22 comprise two horizontal diametrically opposed knives which are mounted on the central shaft 25.

The knives 33, 34 may consist of a blade fitted with a cutting edge, so as to blend at low speed and cut at high speed, or else to blend in one direction and cut in the other.

The means of cutting 22 and blending 20 cooperate to provide the best possible mixing at the bottom and the wall of the receptacle 2 at low speed, and to cut better at high speed, in that the ingredients are continuously directed from the wall to the interior and the bottom of receptacle 2. Beyond that, the sense of rotation of each of these devices is reversible, so as to improve their efficacy.

The nest of shafts 26 of the blending device 20, the stirrer 21 and cutter 22 passes above the receptacle. They are activated in rotation by a motor 35 from body 1 with the aid of the respective driving mechanisms 36, 37 and 38. These driving mechanisms are arranged in part 36A, 37A and 38A within the body 1 and in part 36B, 37B, and 38B in the intermediate element 4, whereby a coupling/uncoupling device 39A, 39B, is provided on the interface between the body 1 and the intermediate element 4. The driving mechanisms 36, 37, 38 are constituted for example by gears effecting speed reduction suitable to each of the treatment devices and for each available speed selection. The coupling/uncoupling device 39 is advantageously associated with locking/unlocking means 7 between the intermediate element 4 and the body 1. It may, for example, be itself formed by two half-axes outfitted with complementary coupling organs. Thus, the movable set 5 may be coupled or detached from body 1 in one single motion attaching or detaching the means of locking/unlocking 7 and the means of coupling/uncoupling 17 and 39.

Preferably, the group of nested shafts 26 is equally suitable for detachment from the intermediate element. To this end, means of locking and unlocking are provided between the set of shafts and the intermediate element along with means of coupling and uncoupling the shafts with the driving devices not illustrated here. This permits easy cleaning of the means of handling 20, 21, and 22.

In order to assure the position of the totality of shafts within the receptacle in the course of operations, provision may be made at the bottom of the receptacle for a spur 40 upon which to position the lower ends of the shafts.

Body 1 contains means of programming and controlling the totality of the driving devices as well as the means for the heating of the receptacle.

The means of programming and control may be constituted by a microprocessor 41 associated with a memory 42 containing several preestablished programs, corresponding to the recipes for the production of the cooked dishes. The microprocessor is linked to a keyboard 43 whereon the user may key in a code to choose the program, the choice being displayed on a screen 44 (FIG. 1).

The program may be chosen by the user either with the aid of a code on keyboard 43 which in such a case may be strictly numerical, or by introducing the name of the recipe via the keyboard 43 which in that case would have to be an alphanumerical keyboard. The keyboard 43 may also be constructed in such a way as to permit the user to define by himself the programming of the recipe. As an alternative, the microprocessor 41 could also be linked to a card reader permitting the insertion of program cards containing the recipes at the users choice.

Preferably, provision is made for the processor to be equally useable with ease as a manual kitchen appliance. To this end, the keyboard 43 will advantageously contain a set of keys corresponding to basic operations such as chopping of onions, beating eggs, heating and stirring chocolate milk, etc.

Figure 3:
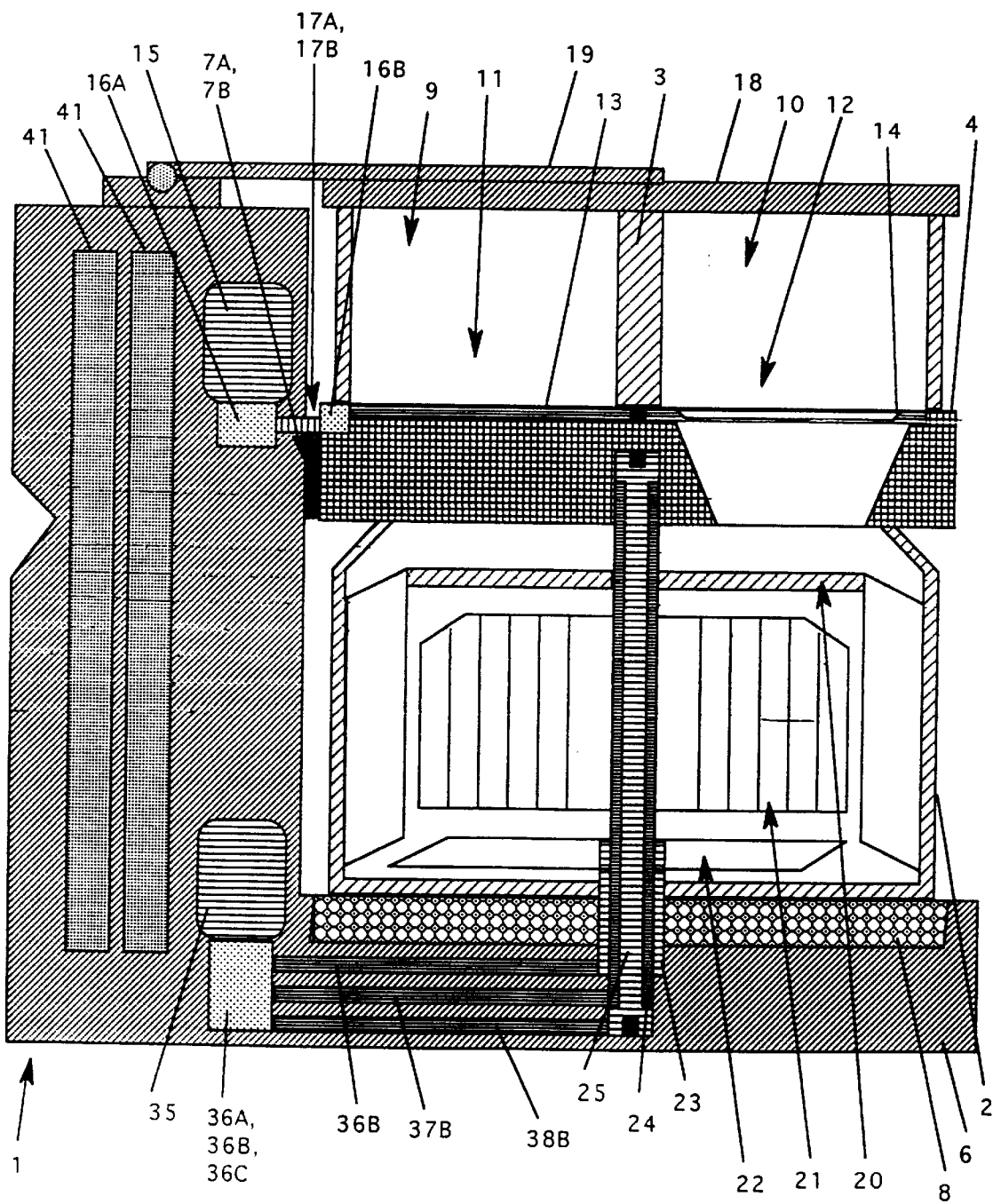
FIG. 3 is a view analogous to FIG. 2 in one alternative embodiment.

According to an alternative embodiment represented in FIG. 3, the driving means 36, 37 and 38 of the handling devices 20, 21 and 22 are not placed in part above the same in the intermediate element 4 but activate the means of handling 20, 21, 22 from below starting from base 6. As shown in the illustration, the driving means 36, 37 and 38 contain here instead of a set of gears, a set of belts and pulleys. In this variant, the means of coupling/uncoupling 39 are suppressed.

FIGS. 4 to 6 represent schematically elementary modes of operation of the means of handling 20, 21 and 22 within the receptacle 2.

According to a first mode known as blending (FIG. 4), the means of mixing 20 and cutting 22 are slowly driven in opposite directions, the sharpened edge of the knives 33, 34 being in the rear. In this way, foodstuffs are simultaneously stirred and scraped off the wall and the bottom of receptacle 2 by spatulas 27, 28 and the knives 33, 34, for example to accompany the cooking of a preparation.

According to a second mode known as cutting (FIG. 5) the cutting means 22 are driven rapidly, the sharpened edge of the blades 33, 34 being forward. In this manner, the foodstuffs are cut, for example to chop the onions.

In these first two modes, the whisk 31,32 of the stirrer 21 is kept bent against the set of shafts 26.

According to a third mode known as stirring (FIG. 6) the stirring means 21 are driven rapidly in rotation in such a way that the whisk 31, 32 is deployed throughout the receptacle 2. In this manner, the foods are stirred for example to beat the eggs.

In the second and third mode, the spatulas 27, 28 of the blender 20 may also be driven slowly, so as to scrape the food off the wall and convey it to the center of the receptacle 2.

These different modes of operation may be associated and combined such that the means of handling may be made to rotate in two directions and at different speeds (slow blend, fast blend, slow cutting, fast cutting, fast stirring).

Figure 7:
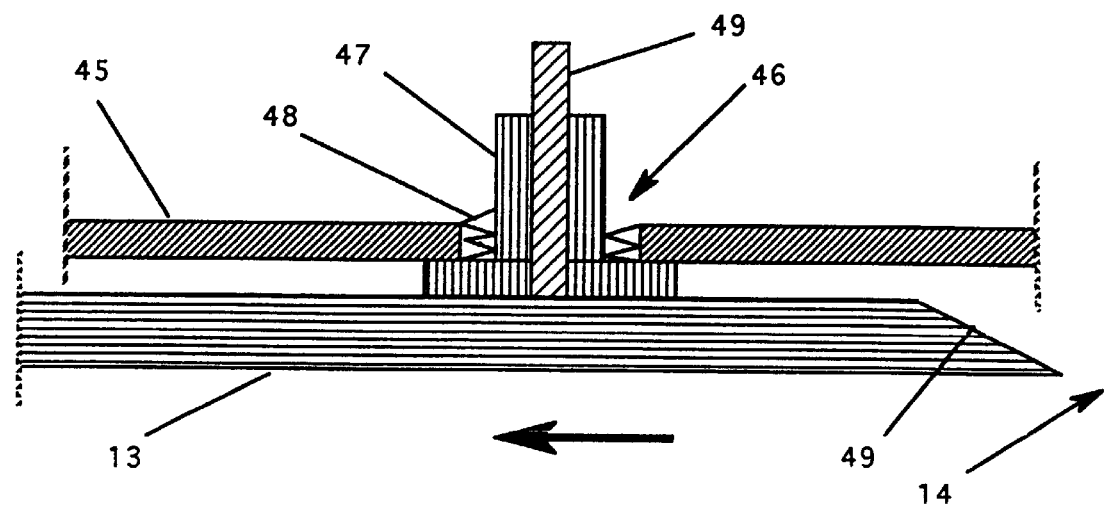
FIG. 7 is a schematic, detailed view in vertical cross-section of the processor shown in FIG. 1, illustrating the bottom of a compartment adapted to contain liquids, in a closed position of the shutter.
Figure 8:
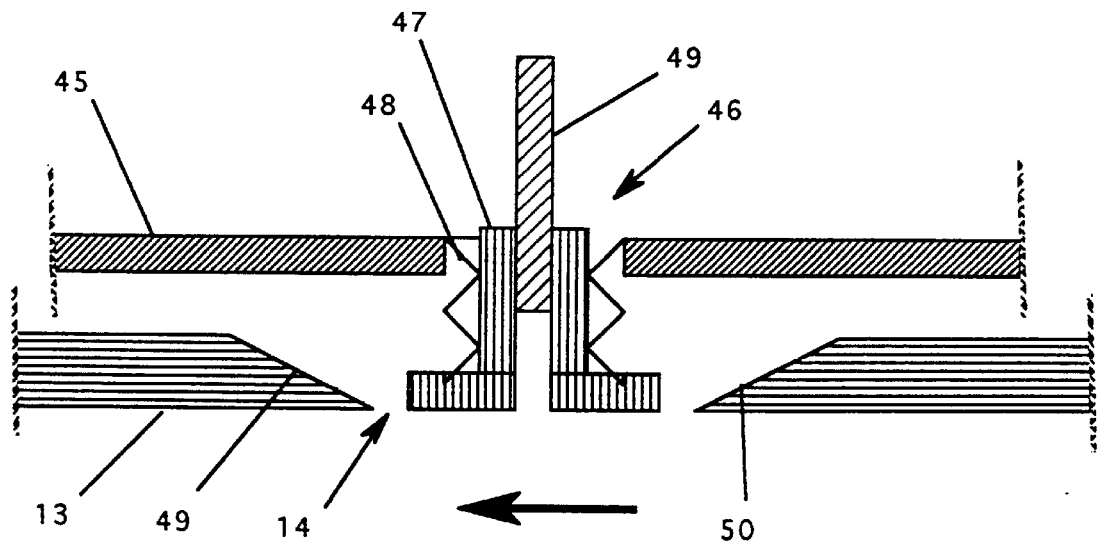
FIG. 8 is a view analogous to FIG. 7 in an open position of the shutter.

According to a variant of the embodiment permitting the use of liquid ingredients, as represented in FIGS. 7 and 8, certain compartments 45 of container 3 comprise an opening 46 which is not shaped as a sector corresponding to the aperture 14 on the rotating disk 13. This opening 46 is of reduced dimensions involving on its underside a movable shutter 47, which is restored to its open position removed from the aperture by a spring 48. The reduced-dimension opening 46 is located on the path of aperture 14 on the rotary disk 13. Thus, the shutter 47 is kept in closed position by the rotary disk 13 up to the moment in which the forward edge 49 of the aperture 14 on the rotary disk 13 appears below the reduced dimension opening 46. At this time, shutter 47 is no longer maintained against the opening 46, but is brought back to its open position by spring 48 in such a way that the liquid contained in compartment 45 pours out into the receptacle 3 through the aperture 14. Once the rear edge 50 of the aperture 14 on the rotary disk 13 appears below the reduced-dimension opening 46, the shutter 47 is on the contrary brought back and restored once again against the reduced-dimension opening 46.

Preferably, the rear edge 50 is beveled at an angle inclined from top to bottom towards the interior of the aperture 14 on the rotary disk 13, so as to facilitate the reassembly of shutter 47. The forward edge 49 may equally be beveled so as to render the opening of the shutter 47 progressive.

In order to adjust the speed of outflow of the liquid, the opening position of shutter 47 may be adjustable. For example, the shutter may be mounted on the screw 51 being in such a case adjustable by rotation of screw 51.

Figure 9:
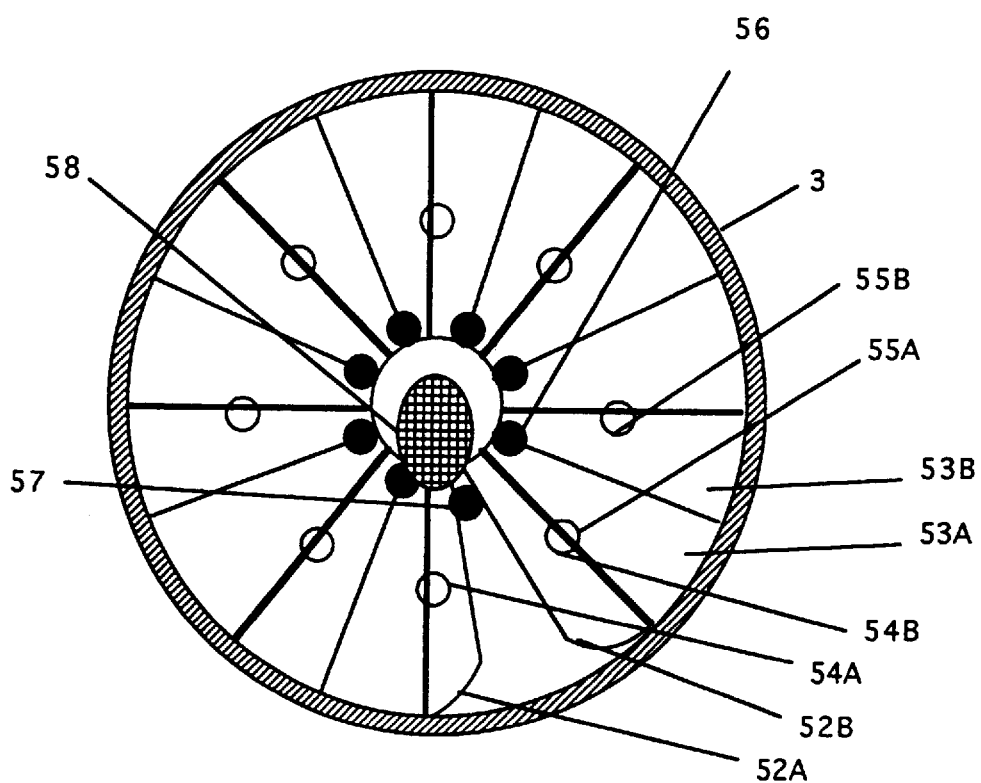
FIG. 9 is a schematic, detailed plane and cross-sectional view of the processor shown in FIG. 1 in a variant embodiment.

According to a second form of embodiment of the connecting means illustrated in FIG. 9, the bottoms of the compartments 9, 10 of container 3 are each constituted by one or two flaps respectively 52A and 52B, 53A and 53B articulated on the lower border of the radial walls of compartments 9, 10. The flaps are brought back to open position by springs 54A and 54B, 55A and 55B, and locked in closed position by a bolt 56, 57.

The bolts 56,57 may be activated to open by a rotating cam 58 mounted on a central upright shaft. This cam 58 is driven step by step in a manner analogous to the rotary disk 13 by the drive motor 15 via the driving device 16.

I claim:

1. A food processor for the preparation of cooked dishes, comprising:
    a main processor body;
    a receptacle for the preparation of cooked dishes;
    a container divided into a plurality of compartments for containing ingredients of the cooked dishes, arranged above the receptacle, each said compartment including an aperture;
    means for connecting the compartments of the container with the receptacle, and means for driving said connecting means starting from the main processor body;
    means for handling the ingredients in the receptacle, and means for driving said means for handling starting from the main processor body;
    means for heating the receptacle;
    means to program and control the connecting means the handling means, the heating means and the respective driving means; wherein
    the container is fixedly mounted on the receptacle by an intermediate element in operating position;
    the receptacle, the container and the intermediate element comprise a set mounted on the processor body in operating position; and
    the means for connecting the compartments of the container with the receptacle are arranged within the intermediate element.

2. A food processor according to claim 1, wherein the set consisting of the receptacle, the container and the intermediate element is movable, and that the processor includes means for locking and unlocking the set on the body and means for coupling and uncoupling of the respective drive means.

3. A food processor according to claim 1, wherein the compartments are arranged in sectors.

4. A food processor according to claim 1, wherein the connecting means includes a rotary disk having an aperture.

5. A food processor according to claim 4, wherein the opening of at least one compartment includes a shutter situated on a path of the aperture of the rotary disk and that the shutter is reset in a position removed from the opening of said one compartment by a spring, such as to be opened when the aperture of the disk stands to the right of the opening of the compartment and is otherwise closed.

6. A food processor according to claim 5, wherein an edge of the aperture of the rotary disk situated in the rear in the sense of rotation of disk is inclined from top to bottom towards the interior of the aperture, so as to facilitate the assembly of the shutter.

7. A food processor claim 1, wherein
    the connecting means include a central rotary cam;
    each compartment of the container is provided with articulated flaps capable of shutting off its respective opening;
    the flaps of each compartment are reset to the opening position and maintained in the closed position by a bolt;
    each bolt of the compartments is arranged in such a way as to be successively set for opening by a central rotary cam.

8. A food processor according to claim 1, wherein the means for handling the ingredients are borne by the intermediate element.

9. A food processor according to claim 1, wherein the means for handling are borne by a base offset from body.

10. A food processor according to claim 1, wherein the driving means include at least one motor and a set of gears connected to shaft pinions on the means of handling.

11. A food processor according to claim 1, wherein the handling means includes a shaft and associated pulleys and wherein the driving means include at least one motor and a set of belts running about the pulleys on the shaft of the handling means.

12. A food processor according to claim 1, wherein
    the receptacle is of cylindrical revolving shape;
    the means for handling comprises means for blending, stirring and cutting, said blending, stirring and cutting means being mounted to rotate on a set of a nest of shafts along a central vertical axis of the receptacle.

13. A food processor according to claim 11, wherein the blending means comprises spatulas with at least one horizontal flank and one eccentric vertical flank adjacent to the vertical peripheral wall of receptacle.

14. A food processor according to claim 12, wherein the stirring means comprises a whisk foldable against the set of shafts.

15. A food processor according to claim 12, wherein the cutting means comprises blades with a large flank for slow speed blending and a sharpened edge for high speed cutting.

16. A food processor according to claim 2, wherein the compartments are arranged in sectors.

17. A food processor according to claim 3, wherein the connecting means include a rotary disk featuring an aperture.

18. A food processor according to claim 13, wherein the stirring means comprises a whisk foldable against the set of shafts.

19. A food processor according to claim 14, wherein the cutting means comprises blades with a large flank for slow speed blending and a sharpened edge for high speed cutting.

* * * * *